United States Patent [19]

Starr

[11] Patent Number: 5,388,231
[45] Date of Patent: Feb. 7, 1995

[54] ENHANCED VMEBUS PROTOCOL UTILIZING PSEUDOSYNCHRONOUS HANDSHAKING AND BLOCK MODE DATA TRANSFER

[75] Inventor: Daryl D. Starr, Milpitas, Calif.

[73] Assignee: Auspex Systems, Inc., Santa Clara, Calif.

[21] Appl. No.: 226,398

[22] Filed: Apr. 12, 1994

Related U.S. Application Data

[63] Continuation of Ser. No. 54,352, Apr. 28, 1993, abandoned, which is a continuation of Ser. No. 863,153, Apr. 2, 1992, abandoned, which is a continuation of Ser. No. 405,636, Sep. 8, 1989, abandoned.

[51] Int. Cl.$^6$ .............................................. G06F 13/42
[52] U.S. Cl. .................................................. 395/325
[58] Field of Search ................. 395/400, 425, 200, 325

[56] References Cited

U.S. PATENT DOCUMENTS

| 4,275,440 | 6/1981 | Adams, Jr. et al. | 364/200 |
| 4,802,085 | 1/1989 | Levy et al. | 364/200 |
| 4,851,990 | 7/1989 | Johnson et al. | 364/200 |

OTHER PUBLICATIONS

IEEE Standard Backplane Bus Specification for Multiprocessor Architectures: Futurebus, 1988.
Parkman, Christopher F., "VICbus: VME Inter-Crate Bus, A Versatile Cable Bus", IEEE Trans. on Nuclear Science, vol. 39 No. 2, pp. 77-84.
Weber, Samuel, "After VMEBUS, What?", Electronics, Feb. 1990, pp. 29-30.
Regula, Jack, "The Proposed SSBLT Standard Doubles the VME64 Transfer Rate", IEEE Micro, Apr. 1992, pp. 64-71.

*Primary Examiner*—Jack B. Harvey
*Assistant Examiner*—Jack A. Lane
*Attorney, Agent, or Firm*—Fliesler, Dubb, Meyer & Lovejoy

[57] ABSTRACT

A pseudo-synchronous fast transfer handshake protocol compatible for use on a VMS backplane bus having a master functional module and a slave functional module logically interconnected by a data transfer bus. The data transfer bus includes a data strobe signal line and a data transfer acknowledge signal line. To accomplish the handshake, the master transmits a data strobe signal of a given duration on the data strobe line. The master then awaits the reception of a data transfer acknowledge signal from the slave module on the data transfer acknowledge signal line. The slave then responds by transmitting a data transfer acknowledge signal of a given duration on the data transfer acknowledge signal line.

3 Claims, 16 Drawing Sheets

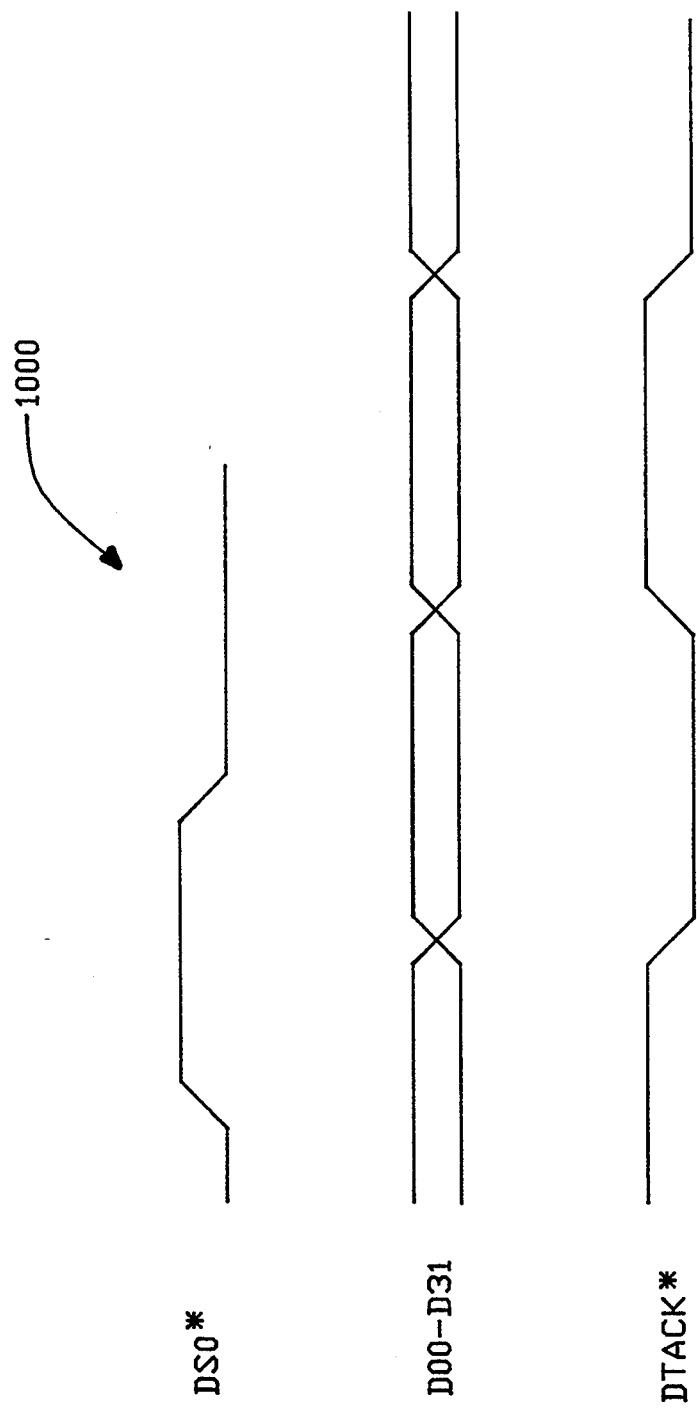

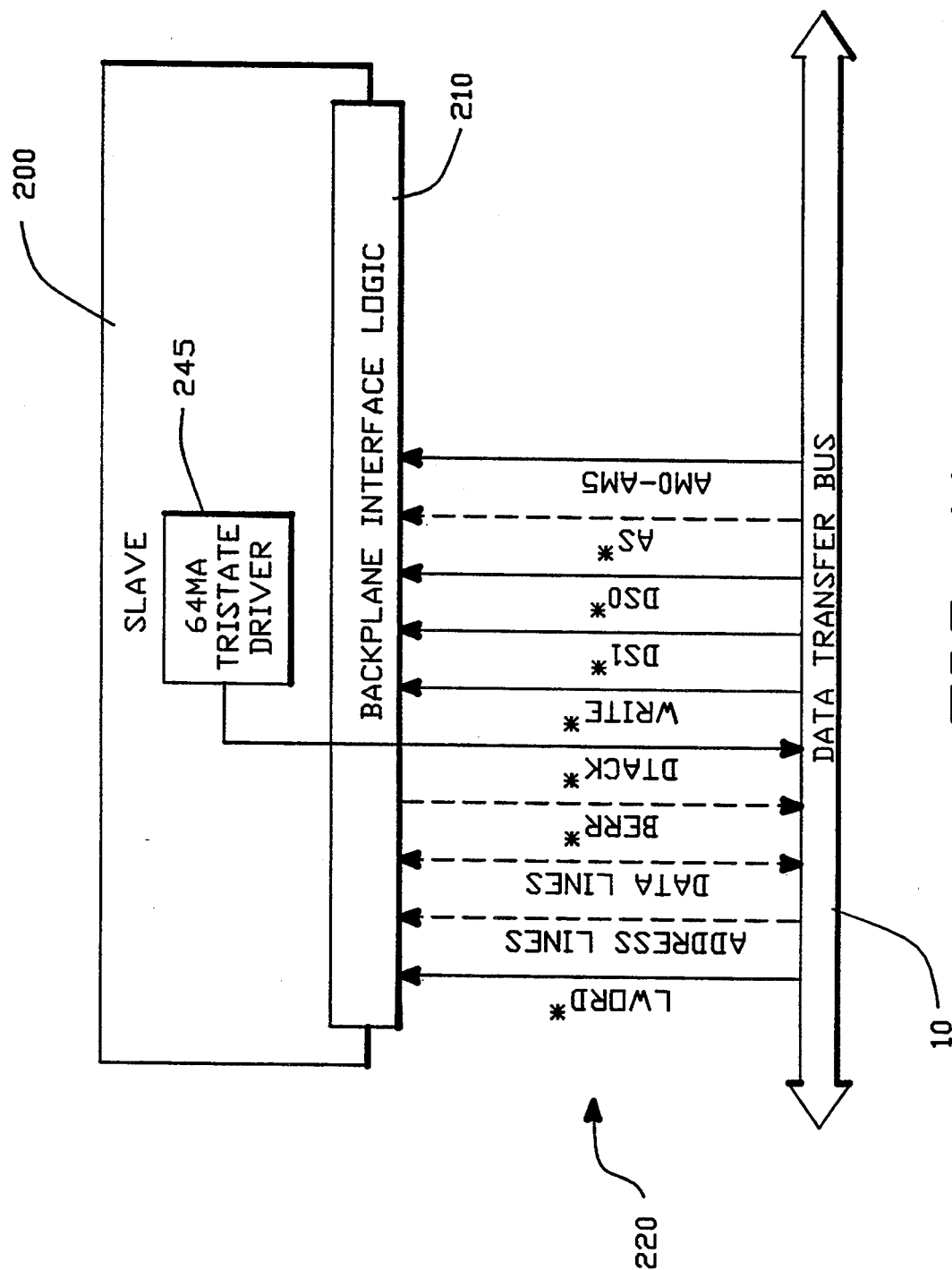

ENHANCED VMEBUS PROTOCOL UTILIZING PSEUDOSYNCHRONOUS HANDSHAKING AND BLOCK MODE DATA TRANSFER

This application is a continuation of Ser. No. 08/054,352, filed Apr. 28, 1993, now abandoned, which is a continuation of Ser. No. 07/863,153, filed Apr. 2, 1992, now abandoned, which is a continuation of Ser. No. 07/405,636, filed Sep. 8, 1989, now abandoned.

FIELD OF THE INVENTION

The present invention relates generally to the field of microcomputers and, more specifically, to an enhanced VME backplane bus protocol for use in a microcomputer system.

Background of the Invention

Over the past several years, the computer industry has experienced a remarkable evolution in the architecture of technical and office computing systems. Distributed "smart" workstations have increasingly replaced the simple "dumb" terminal attached to a mainframe or microcomputer. These "smart" workstations are, themselves, computers having local processing ability and local memory storage. Such "smart" workstations comprise part of a larger network, which includes a wide variety of processors, data storage and communication devices, and other peripherals.

A workstation network generally consists of individual user workstations (referred to as "clients") and shared resources for filing, data storage, printing and wide-area communications (referred to individually as "servers"). The clients and servers are interconnected along a local area network ("LAN"), such as an ethernet. Multiple ethernets may be connected to one another by a backbone ethernet.

Clients along an ethernet are typically connected to a server providing the clients with data and storage facilities. Since the resource most commonly used is file storage and transfer, physical servers are often generically referred to as "file servers." A conventional server might include a central processing unit ("CPU") coupled to the ethernet. The CPU itself is coupled to a primary memory device. Both the CPU and the primary memory device are connected to a conventional input-output device ("I/O"), such as a bus. Using the bus, the CPU may communicate with other devices such as disk controllers, for mass storage, or other peripheral devices.

Although processor technology and performance has increased significantly in recent years, input/output performance has not commensurately improved to date. Thus, although the processing performance capabilities of the CPU are considerable, the overall performance of the system is less formidable due to the lower performance threshold of I/O embodied in the bus.

The level of performance of any bus is largely determined by the time required to execute data transfer transactions across the bus. If the transaction time for a given transaction across the bus can be optimized to the shortest period of time possible, the bus will be capable of handling more transactions in a given period of time. Hence, performance is increased as the bus is capable of handling a greater number of transactions during a given period of time.

The VME backplane bus (hereinafter "VMEbus") is one of the most popular I/O bus systems presently in use. The VMEbus is widely implemented and standard throughout the industry. To this end, the Standards Committee of the Institute of Electrical and Electronics Engineers ("IEEE") has formulated and published VMEbus standards in a publication entitled *VMEbus Specification Manual*, revision D1.2. (hereinafter "the VMEbus standard"), which is hereby incorporated by reference.

The standard VMEbus interface system consists of backplane interface logic, four groups of signal lines referred to as "buses," and a collection of functional modules which communicate with one another using the signal lines. The four buses are the data transfer bus ("DTB"), arbitration bus, priority interrupt bus and utility bus. The present application is principally concerned with the DTB.

The DTB allows "masters," which are functional modules, such as the CPU or other intelligent controllers connected to the VMEbus, that initiate DTB cycles, to direct the transfer of binary data between themselves and "slaves." A "slave" is a functional module, such as primary memory, which detects DTB cycles initiated by a "master" and, when those cycles specify its participation, transfers data to or receives data from its "master."

There are seven DTB cycles which a "master" may implement on the DTB: READ, WRITE, BLOCK READ, BLOCK WRITE, READ-MODIFY-WRITE, ADDRESS ONLY, and INTERRUPT ACKNOWLEDGE CYCLE.

In a READ cycle, one, two, three or four bytes of parallel data are transferred across the DTB from master to slave. The READ cycle begins when the master broadcasts an address and an address modifier and places data on the DTB. Each slave captures the address and address modifier and determines whether it is to respond to the cycle. The intended slave recipient retrieves the data from its internal storage and places the data on the DTB, acknowledging the data transfer.

In a WRITE cycle, one, two, three or four bytes of parallel data are transferred across the bus from a master to a slave. The cycle commences when the master broadcasts an address and address modifier and places data on the DTB. Each slave on the bus captures the address and address modifier and determines whether it is to respond to the cycle. The intended slave(s) stores the data and acknowledges the transfer.

The BLOCK READ cycle is a DTB cycle used to transfer a block of one to two-hundred fifty-six bytes from a slave to a master. The BLOCK READ transfer is accomplished using a string of one, two or four byte-wide (i.e., 8, 16, or 32 bit-wide data words) data transfers. Once the block transfer is started, the master does not release the DTB until all of the bytes have been transferred. The BLOCK READ cycle differs from a string of READ cycles in that the master broadcasts only one address and address modifier at the beginning of the cycle. The slave increments the address on each transfer in order that the data for the next transfer is retrieved from the next higher location.

The BLOCK WRITE cycle, like the BLOCK READ cycle, is a DTB cycle used to transfer a block of one to two-hundred fifty-six bytes from a master to a slave. The BLOCK WRITE transfer is accomplished using a string of one, two or four byte-wide data transfers. Once the block transfer is started, the master does not release the DTB until all of the bytes have been transferred. The BLOCK WRITE cycle differs from a string of WRITE cycles in that the master broadcasts only one address and address modifier at the beginning of the cycle. The slave increments the address on each transfer in order that the data for the next transfer is retrieved from the next higher location.

The READ-MODIFY cycle is a DTB cycle used to both read from and write to a slave location without permitting another master access to the slave location.

The ADDRESS-ONLY cycle consists only of an address broadcast. Data is not transferred. Slaves do not acknowledge ADDRESS-ONLY cycles and the master terminates the cycle without waiting for an acknowledgement.

It should be noted that this differs from "synchronous" systems in that in totally "synchronous" systems the response of the slave is irrelevant. This initiation of a DTB cycle is referred to in the art as "handshaking." After a master initiates a data transfer cycle it waits for the designated slave to respond before finishing the cycle. The asynchronous nature of the VMEbus allows a slave to take as long as it needs to respond. The VMEbus requires four propagations across the DTB to complete a single handshake sequence. If a slave fails to respond because of a malfunction or if the master accidentally addresses a location where there is no slave, the bus timer intervenes allowing the cycle to be terminated.

The VMEbus standard specifies the use of location monitors, which are on the functional modules, to monitor data transfers over the DTB. Each operates to detect accesses to the locations it has been assigned to watch. When an access to one of these assigned locations occurs, the location monitor typically signals its on-board processor by means of an interrupt request signal. In such a configuration, if processor A writes into the global VMEbus memory monitored by processor B's location monitor, processor B will be interrupted.

The DTB includes three types of lines: addressing lines, data lines and control lines.

Masters use address lines numbers 2 through 31, denoted as A02 through A31, to select a four-byte group to be accessed. Four additional lines, data strobe zero (DS0*), data strobe one (DS1*), address line number one (A01) and longword (LWORD*), are then used to select which byte locations within the four-byte group are accessed during the data transfer. The asterisk following the abbreviated line designation denotes that these lines are "active low" (i.e., considered "active" when driven low). Using these four lines, a master can access one, two, three or four-byte locations simultaneously, depending upon the type of cycle initiated.

The DTB includes six address modifier lines which allow the master to pass additional binary information to the slave during a data transfer. Sixty-four possible modifier codes exist, which are classified into each of three categories: defined, reserved and user defined. User defined codes may be used for any purpose which the user deems appropriate. Typical uses of the user defined codes include page switching, memory protection, master or task identification, privileged access to resources and so forth.

Thirty-two data lines, D00 through D31, actually transfer data across the bus. The master may simultaneously access up to four byte locations. When the master has selected the byte locations to be accessed, it can transfer binary data between itself and those locations over the data bus.

The DTB includes six control lines: address strobe (AS*), data strobe zero (DS0*), data strobe one (DS1*), bus error (BERR*), data transfer acknowledge (DTACK*), and read/write (WRITE*). The VME standard requires that the control lines be considered "active" when driven low.

A falling edge on the AS* line informs all slave modules that the broadcasted address is stable and can be captured.

DS0* and DS1*, in addition to their function in selecting byte locations for data transfer, also serve control functions. On WRITE cycles, the first falling edge of the data strobe indicates that the master has placed valid data on the data bus. On READ cycles, the first rising edge tells the slave when it can remove valid data from the DTB.

A slave will drive DTACK* low to indicate that it has successfully received the data on a WRITE cycle. On a READ cycle, the slave drives DTACK* low to indicate that it has placed data on the DTB.

The BERR* line is an open-collector signal driven low by the slave or the bus timer to indicate to the master that the data transfer was unsuccessful. For example, if a master tries to write to a location which contains Read-Only memory, the responding slave might drive BERR* low. If the master tries to access a location that is not provided by any slave, the bus timer would drive BERR* low after waiting a specified period of time.

WRITE* is a level significant line strobed by the leading edge of the first data strobe. It is used by the master to indicate the direction of data transfer operations. When WRITE* is driven low, the data transfer direction is from the master to the slave. When WRITE* is driven high, the data transfer direction is from the slave to the master.

The VMEbus standard sets forth a handshake which requires four separate propagations across the VMEbus. The master asserts DS0* and DS1* to initiate the data transfer cycle. The slave, in response to the master's assertion of DS0* and DS1*, asserts DTACK*. In response to the assertion of DTACK* by the master, the master deasserts DS0* and DS1*. The slave, in response, deasserts DTACK* to complete the handshake. Each four of these propagations is required to accomplish the handshake.

The transfer rate across a typical VMEbus is generally in the range of 20 to 30 megabytes per second. However, in situations where a great deal of data must be transferred very quickly from one device on the VMEbus to another device on the VMEbus or a large number of data transfers need to be made, this transfer rate can oftentimes be slow enough to result in processing delays. Accordingly, in order to maximize data transfer and processing efficiency, the transfer rate of data across the VME backplane bus should be increased.

To date, there has been little progress made in increasing the transfer rate beyond the 20 to 30 megabytes per second range. Adherence to the VMEbus standard poses a problem with respect to improving the data transfer rate of the VMEbus.

The popularity of the VMEbus is due, in large part, to both the widespread implementation of the VMEbus standard and the industry-wide compatibility of other systems and peripherals. Indeed, it is this paramount consideration of compatibility which has, to some extent, retarded efforts to increase the performance of the VMEbus. The architecture of a compatible VMEbus must be consistent with the VMEbus standard. Performance problems must be resolved within the context of the VMEbus standard if compatibility is to be maintained.

SUMMARY OF THE INVENTION

The present invention is directed to a VMEbus compatible pseudo-synchronous fast transfer handshake protocol for use on a VME backplane bus having a master functional module and a slave functional module logically interconnected by a data transfer bus. The data transfer bus includes a data strobe signal line and a data transfer acknowledge signal line. To accomplish the handshake, the master transmits a data strobe signal of a given duration on the data strobe line. The master then awaits the reception of a data transfer acknowledge signal from the slave module on the data transfer acknowledge signal line. The slave then responds by transmitting a data transfer acknowledge signal of a given duration on the data transfer acknowledge signal line.

Consistent with the pseudo-synchronous nature of the handshake protocol, the data to be transferred is referenced to only one signal depending upon whether the transfer operation is a READ or WRITE operation. In transferring data from the master functional unit to the slave, the master broadcasts the data to be transferred. The master asserts a data strobe signal and the slave, in response to the data strobe signal, captures the data broadcast by the master. Similarly, in transferring data from the slave to the master, the slave broadcasts the data to be transferred to the master unit. The slave then asserts a data transfer acknowledge signal and the master, in response to the data transfer acknowledge signal, captures the data broadcast by the slave.

The fast transfer protocol of the present invention facilitates the rapid transfer of large amounts of data across a VME backplane bus by substantially increasing the data transfer rate. These data rates are achieved by using a handshake wherein the data strobe and data transfer acknowledge signals are functionally decoupled and by specifying high current drivers for all data and control lines. In systems implementing the present invention, data rates of up to 70 megabytes per second are possible on 32 data lines.

The enhanced pseudo-synchronous method of data transfer (hereinafter referred to as "fast transfer mode") is implemented so as to comply and be compatible with the IEEE VME backplane bus standard. The present invention utilizes user-defined address modifiers, defined in the VMEbus standard, to indicate use of the fast transfer mode. Conventional VMEbus functional units, capable only of implementing standard VMEbus protocols, will ignore transfers made using the fast transfer mode and, as a result, are fully compatible with functional units capable of implementing the fast transfer mode.

The fast transfer mode reduces the number of bus propagations required to accomplish a handshake from four propagations, as required under conventional VMEbus protocols, to two bus propagations, as required by the fast transfer mode protocol of the present invention. Likewise, the number of bus propagations required to effect a BLOCK READ or BLOCK WRITE data transfer has been reduced. Consequently, by reducing the propagations across the VMEbus to accomplish handshaking and data transfer functions, the transfer rate is materially increased.

It is an object of the present invention to enable an increased data transfer rate for data transferred across a bus complying with VME backplane bus standards.

It is an object of the present invention to implement a pseudo-synchronous method of transferring data across a VMEbus which complies with VME backplane bus standards.

It is a further object of the present invention to maintain compatibility between functional units implementing the present invention and functional units only implementing standard VMEbus protocols.

BRIEF DESCRIPTION OF THE DRAWINGS

FIG. 10A illustrates a data transfer cycle which could be inserted in the location of box 1000 in FIG. 10.

FIG. 11 is a block diagram illustrating the principal signal lines logically connecting the data transfer bus to a modified slave functional unit, as implemented in the preferred embodiment of the present invention.

DESCRIPTION OF THE PREFERRED EMBODIMENTS

I. System Overview

Figure 1:
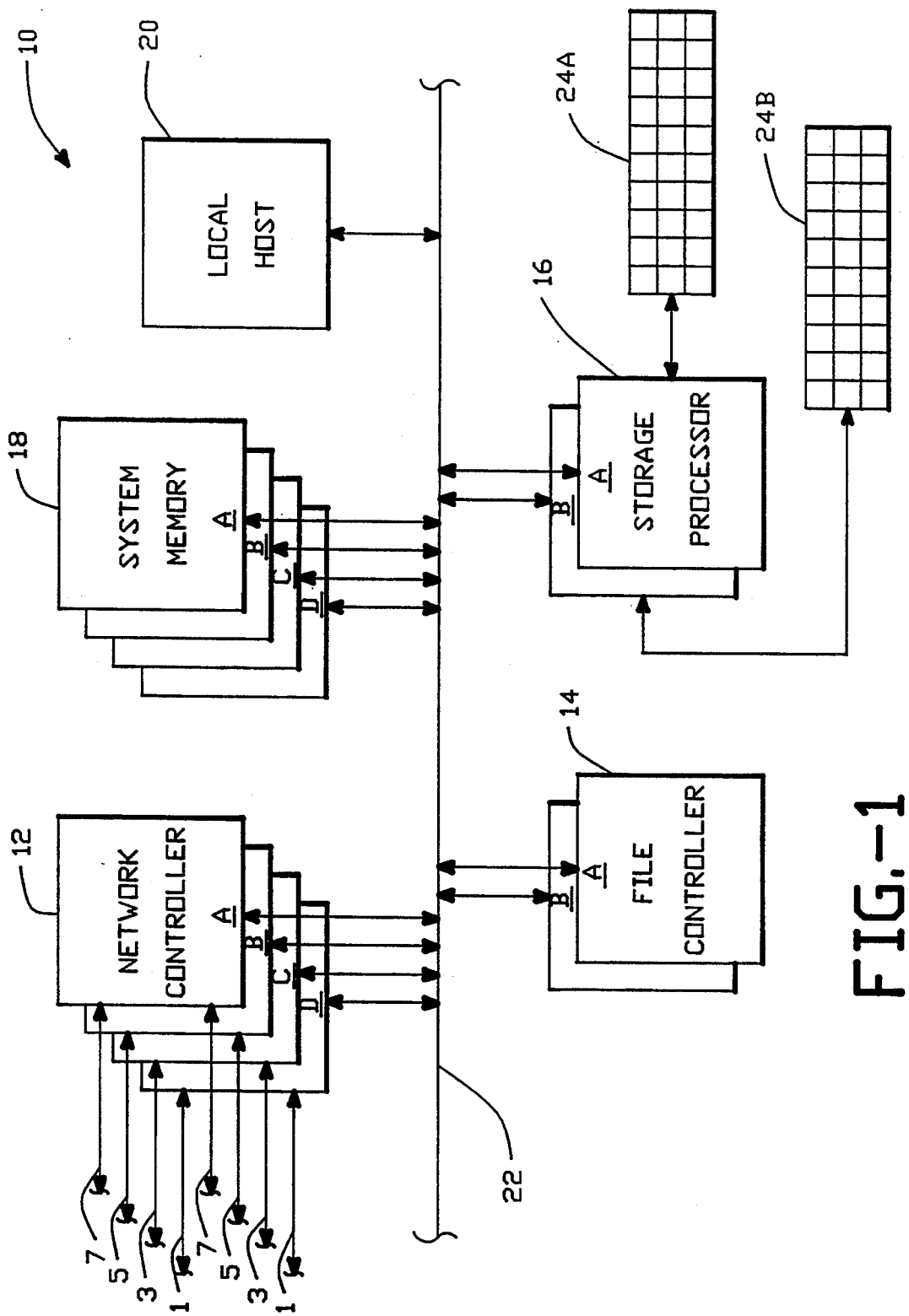
FIG. 1 is a block diagram representing the preferred embodiment of the hardware support for the present invention.

A block diagram representing the preferred embodiment of the hardware support for the present invention, generally indicated by the reference numeral 10, is provided in FIG. 1. The architecture of the preferred hardware system 10 is described in the above-identified related application entitled PARALLEL I/O NETWORK FILE SERVER ARCHITECTURE which application is expressly incorporated by reference.

The hardware components of the system 10 include multiple instances of network controllers 12, file system controllers 14, and mass storage processors 16 interconnected by a high-bandwidth backplane bus 22. Each of these controllers 12, 14, 16 preferably include a high performance processor and local program store, thereby minimizing their need to access the bus 22. Rather, bus 22 accesses by the controllers 12, 14, 16 are substantially limited to transfer accesses as required to transfer control information and client workstation data between the controllers 12, 14, 16 system memory 18, and a local host processor 20, when necessary.

The illustrated system 10 configuration includes four network controllers 12A-D, two file controllers 14A-B, two mass storage processors 16A-B, a bank of four system memory cards 18A-D and a local host processor 20 coupled to the backplane bus 22. Each network controller (NC) 12 preferably includes two independent Ethernet network connections, shown as the network pairs 1, 3, 5 and 7, controlled by a Motorola 68020 processor. Each of the network connections directly support the ten megabit per second data rate specified for a conventional individual Ethernet network connection. The preferred hardware embodiment of the present invention thus realizes a combined maximum data throughput potential of 80 megabits per second.

The file controllers (FC) 14, intended to operate primarily as specialized compute engines, each include a high-performance Motorola 68020 based microprocessor system, two megabytes of local program memory and a smaller half-megabyte high-speed data store.

The mass storage processors (SP) 16 function as intelligent small computer system interface (SCSI) controllers. Each includes a Motorola 68020 based microprocessor system, a local program and data memory, and an array of ten parallel SCSI channels. Drive arrays 24A-B are coupled to the storage processors 16A-B to provide mass storage. Preferably, the drive arrays 24A-B are ten unit wide arrays of SCSI storage devices from one to three units deep uniformly. The preferred embodiment of the present invention uses conventional 768 megabyte 5¼-inch hard disk drives for each unit of the arrays 24A-B. Thus, each drive array level achieves a storage capacity of approximately 6 gigabytes, with each storage processor readily supporting 18 gigabytes, and a system 10 capable of realizing a total combined data storage capacity of 36 gigabytes.

The local host processor 20, in the preferred embodiments of the present invention, is a Sun 3/40 central processor card, model Sun 3E120 manufactured and distributed by Sun Microsystems, Inc.

Finally, the system memory cards 18 each provide 32 megabytes of 32-bit memory for shared use within the computer system 10. The memory is logically visible to each of the processors of the system 10.

A VMEbus 22 is used in the preferred embodiments of the present invention to interconnect the network controllers 12, file controllers 14, storage processor 16, system memory 18, and local host 20. The hardware control logic for controlling the VMEbus 22, as at least implemented on the network controller 12 and storage processor 16, has been enhanced to support the bus master fast transfer protocol of the present invention. The system memory 18 also implements the modified slave VMEbus control logic, also in accordance with the present invention, to allow the system memory 18 to act as the data transfer data source or destination for the network controller 12 and storage processors 16.

It should be understood that, while the system 10 configuration represents the initially preferred maximum hardware configuration, the present invention is not limited to the preferred number or type of controllers or the preferred size and type of disk drives.

II. Enhanced VMEbus Overview

Figure 2:
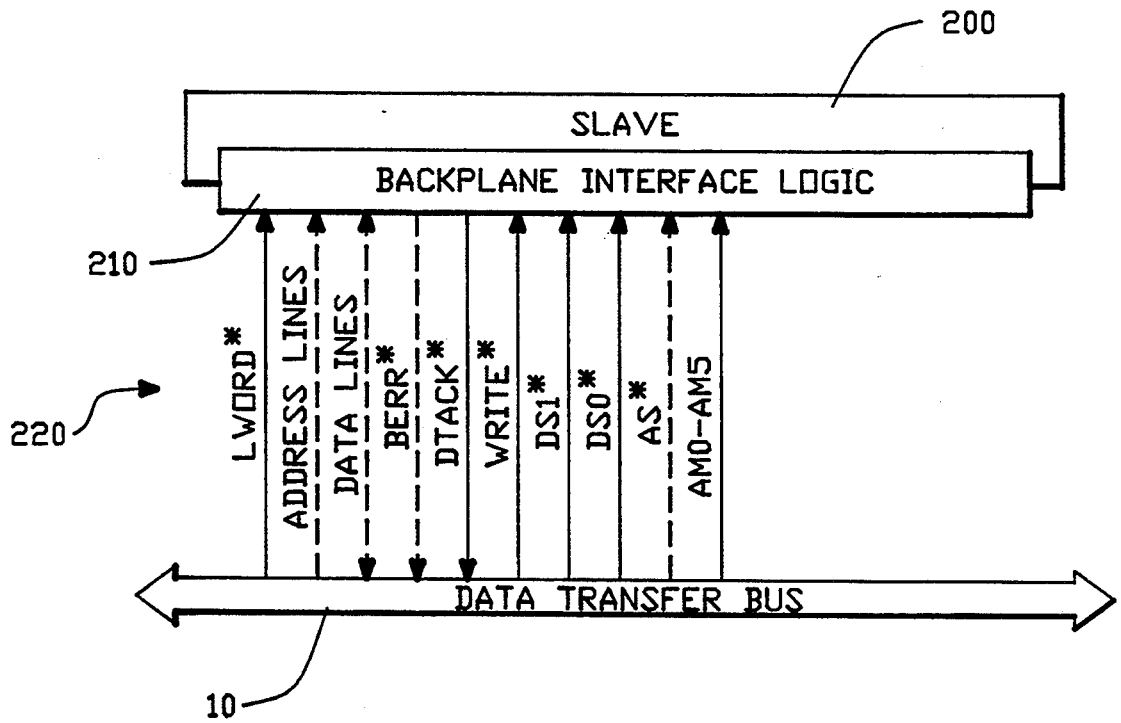
FIG. 2 is a block diagram illustrating the principal signal lines logically connecting the data transfer bus to a master functional unit, as required by the VMEbus standard.
Figure 3:
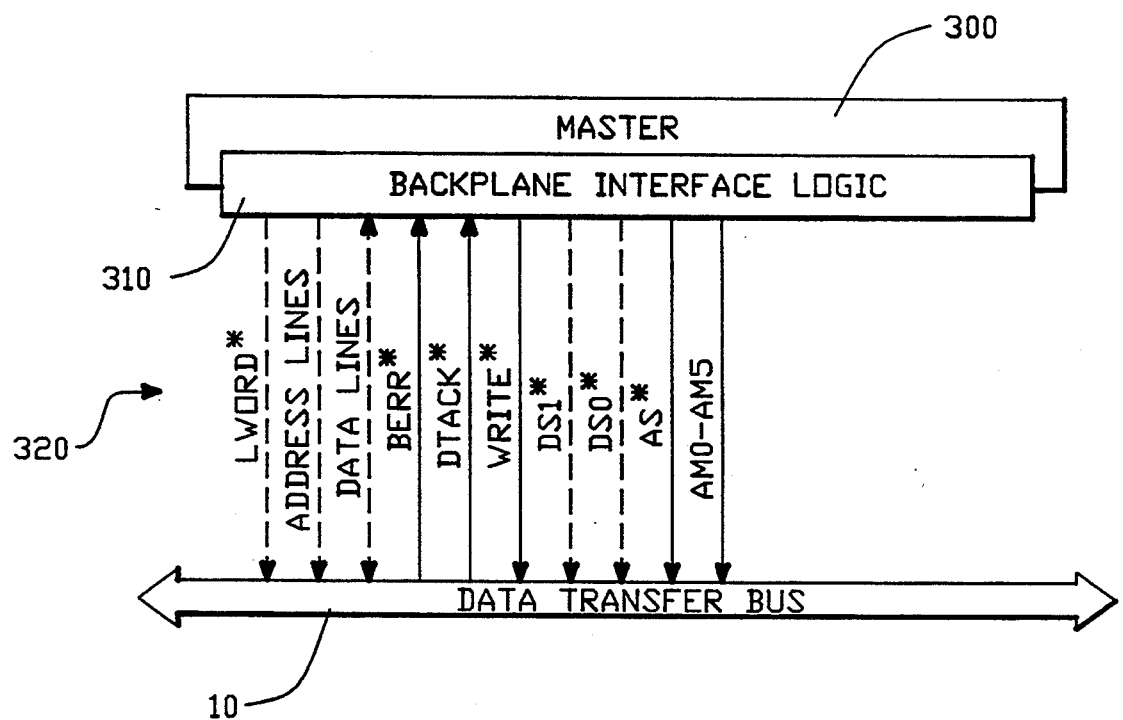
FIG. 3 is a block diagram illustrating the principal signal lines logically connecting the data transfer bus to a slave functional unit, as required by the VMEbus standard.

FIGS. 2 and 3 are, respectively, block diagrams of typical master and slave functional units (respectively hereinafter "master" and "slave"). The signal lines interconnecting the master and slave across the data transfer bus (DTB), as shown in FIGS. 2 and 3, are the following:

| | |
|---|---|
| A01-A15 | ADDRESS bus (bits 1-15) - Three-state driven address lines that are used to broadcast a short, standard, or extended address. |
| A16-A23 | ADDRESS bus (bits 16-23) - Three-state driven address lines that are used in conjunction with A01-A15 to broadcast a standard or extended address. |
| A24-A31 | ADDRESS bus (bits 24-31) - Three-state driven address lines that are used in conjunction with A01-A23 to broadcast an extended address. |
| AM0-AM5 | ADDRESS MODIFIER (bits 0-5) - Three-state driven lines that are used to broadcast information such as address size, cycle type, and/or MASTER identification. |
| AS* | ADDRESS STROBE - A three-state driven signal that indicates when a valid address has been placed on the address bus. |
| BERR* | BUS ERROR - An open-collector driven signal generated by a SLAVE or BUS TIMER. This signal indicates to the MASTER that the data transfer was not completed. |
| D00-D31 | DATA BUS - Three-state driven bidirectional data lines used to transfer data between MASTERS and SLAVES. |
| DS0*, DS1* | DATA STROBE ZERO, ONE - Three-state driven signals used in conjunction with LWORD and A01 to indicate how many data bytes are being transferred (1, 2, 3, or 4). During a write cycle, the falling edge of the first data strobe indicates that valid data is available on the data bus. On a read cycle, the rising edge of the first data strobe |

| | -continued |
|---|---|
| | indicates that data has been accepted from the data bus. |
| DTACK* | DATA TRANSFER ACKNOWLEDGE - A three-state driven signal generated by a SLAVE. The falling edge of this signal indicates that valid data is available on the data bus during a read cycle, or that data has been accepted from the data bus during a write cycle. The rising edge indicates when the SLAVE has released the data bus at the end of a READ CYCLE. |
| LWORD* | LONGWORD - A three-state driven signal used in conjunction with DS0*, DS1*, and A01 to select which byte location(s) within the 4 byte group are accessed during the data transfer. |
| WRITE* | WRITE - A three-state driven signal generated by the MASTER to indicate whether the data transfer cycle is a read or write. A high level indicates a read operation; a low level indicates a write operation. |

As shown in FIG. 2, the slave functional module is logically connected to backplane interface logic 210. The backplane interface logic 210 is connected to the data transfer bus 10 by signal lines 220. The signal flow direction of the signal lines 220 is indicated by the direction of the respective arrows. The DTACK* signal line originates with the slave and is driven by a conventional 64 mA three-state driver. The data lines are, of course, bidirectional, as shown in FIG. 2.

As shown in FIG. 3, the master functional module is logically connected to backplane interface logic 310. The backplane interface logic 310 is connected to the data transfer bus 10 by signal lines 320. The signal flow direction of the signal lines 320 is indicated by the direction of the respective arrows. The DS0*, DS1*, AS* and AM0 through AM5 signal lines originate with the master. The data lines, D00 through D31, are, of course, bidirectional, as shown in FIG. 3.

III. Enhanced VMEbus Fast Transfer Protocol

The present invention increases the data transfer rate across the VMEbus by reducing the number of bus propagations required to accomplish handshaking and data transfer.

Figure 4A:
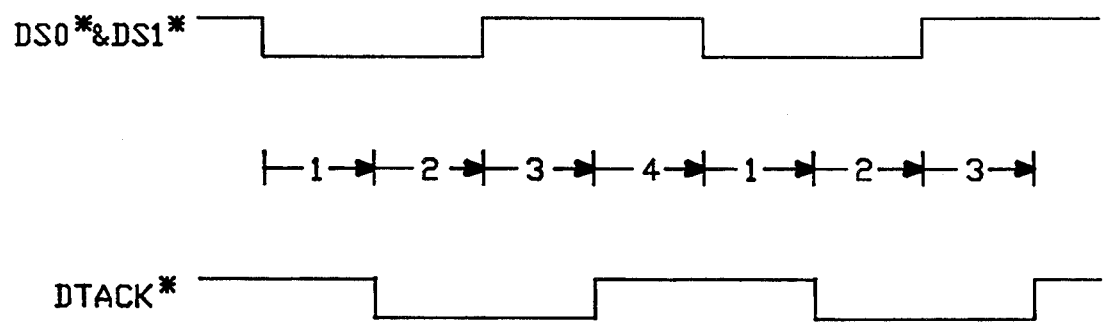
FIG. 4A is a timing diagram illustrating the conventional VMEbus standard handshaking protocol.

FIG. 4A illustrates the conventional handshaking protocol defined by the VMEbus standard. Four bus propagations are required to accomplish a handshake using the conventional VMEbus handshaking protocol. A master will initiate a data transfer over the DTB by asserting DS0* and DS1*, shown as propagation 1 in FIG. 4A. The addressed slave then asserts DTACK*, shown as propagation 2 in FIG. 4A. The master, upon receiving the assertion of DTACK* driven by the slave, deasserts DS0* and DS1*, shown as propagation 3 in FIG. 4A. The slave, upon receiving deassertion of DS0* and DS1*, deasserts DTACK,, shown as propagation 4 in FIG. 4A. Upon the deassertion of DTACK by the slave, the handshake is then completed.

Figure 4B:
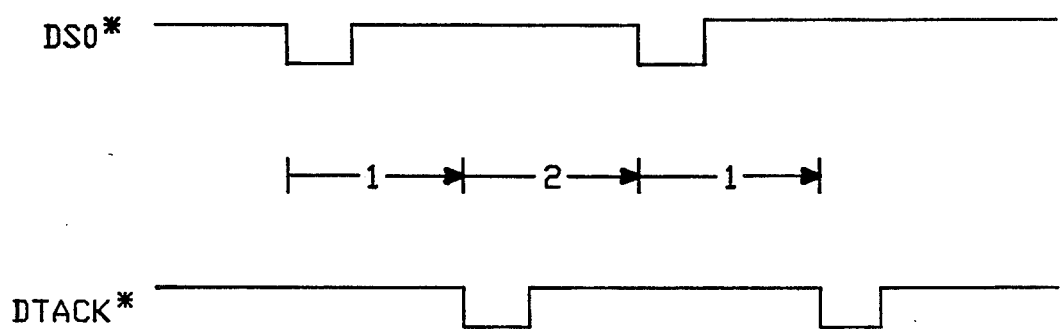
FIG. 4B is a timing diagram illustrating the fast transfer mode handshake.

FIG. 4B is a timing diagram illustrating the fast transfer mode handshake protocol. Only two bus propagations are used to accomplish a handshake. At the initiation of a data transfer cycle, the master will assert and deassert DS0* in the form of a pulse of a given duration in the manner shown as propagation 1 in FIG. 4B. The deassertion of DS0* is accomplished without regard as to whether a response has been received from the slave. Hence, the DS0* signal is wholly decoupled from the DTACK* signal.

The master must then wait for an acknowledgement from the slave. Subsequent pulsing of DS0* cannot occur until a responsive DTACK* signal is received from the slave. Upon receiving the slave's assertion of DTACK,, shown as propagation 2 in FIG. 4B, the master can then immediately reassert data strobe, if so desired. The fast transfer mode protocol of the present invention does not require the master to wait for the deassertion of DTACK* by the slave as a condition precedent to the subsequent assertions of DS0*. In the fast transfer mode, only the leading edge (i.e., the assertion) of a signal is significant. Thus, the deassertion of either DS0* or DTACK* is completely irrelevant for completion of a handshake.

It should be noted that the fast transfer protocol of the present invention does not employ the DS1* line for data strobe purposes. The use of both DS0* and DS1* would be undesirable in the present context. Because DS0* and DS1* are driven by different drivers, skew between the signals is very common problem. Skew between DS0* and DS1* results in delay of the assertion of the data strobe condition required to signal a data transfer. Accordingly, under the present invention, the DS1* line is not used in the handshake process. Skew problems are eliminated by referencing on DS0* for data strobe purposes under the fast transfer mode protocol of the present invention.

The fast transfer mode protocol may be characterized as pseudo-synchronous as it includes both synchronous and asynchronous aspects. The fast transfer mode protocol is synchronous in character due to the fact that DS0* is asserted and deasserted without regard to a response from the slave. The asynchronous aspect of the fast transfer mode protocol is attributable to the fact that the master may not subsequently assert DS0* until a response to the prior strobe is received from the slave. Consequently, because the present invention includes both synchronous and asynchronous components, it is most accurately classified as "pseudo-synchronous."

Figure 5A:
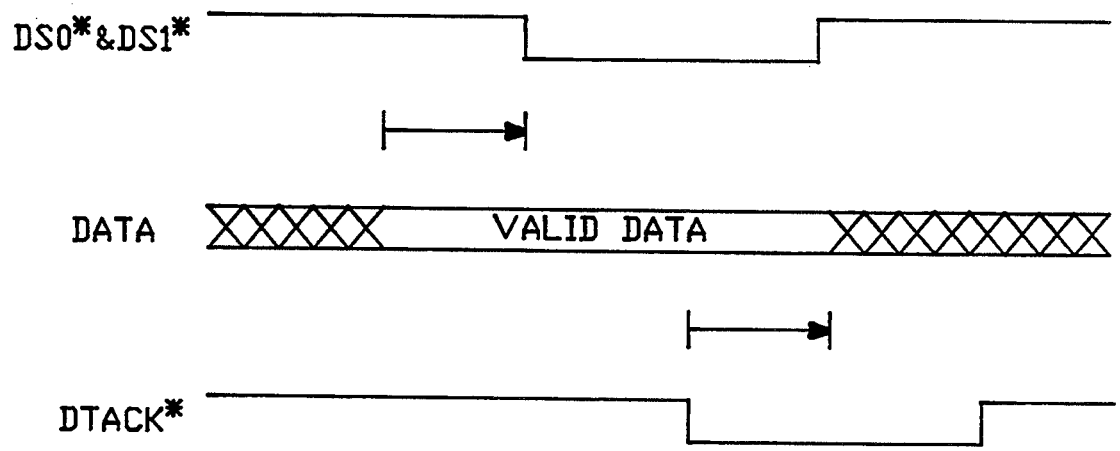
FIG. 5A is a timing diagram illustrating the standard VMEbus protocol for data referencing during a BLOCK WRITE cycle.

FIG. 5A is a timing diagram illustrating the standard VMEbus protocol for data referencing during a BLOCK WRITE cycle. In a standard VMEbus BLOCK WRITE operation, the data to be transferred is broadcast, as shown in FIG. 5A, and the master asserts DS0* and DS1*. The slave receives the data and asserts DTACK*. Under the standard VMEbus protocol, valid data is guaranteed to be broadcast to the slave for a known period of time after the assertion of DTACK* by the slave. The master then deasserts DS0* and DS1*. The BLOCK WRITE cycle is completed upon deassertion of DTACK* by the slave.

Figure 5B:
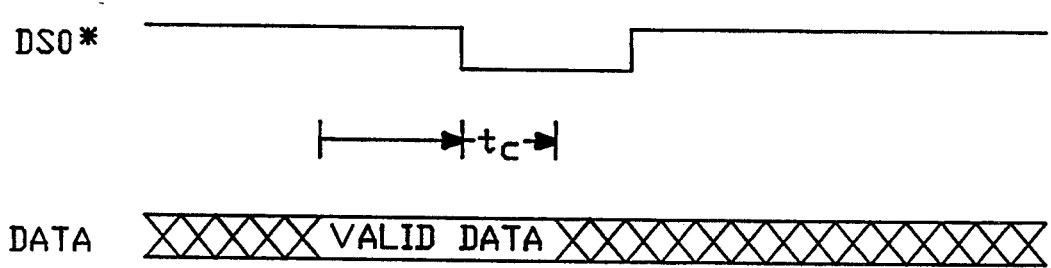
FIG. 5B is a timing diagram illustrating the fast transfer protocol of the present invention for data referencing during a BLOCK WRITE cycle.

FIG. 5B is a timing diagram illustrating the fast transfer protocol of the present invention for data referencing during a BLOCK WRITE cycle. The transfer of data during a BLOCK WRITE cycle is referenced only to DS0*, as shown in FIG. 5B. The master broadcasts valid data to the slave. The master then asserts DS0* to the slave, as shown in FIG. 5B. The slave is given a predetermined period of time, $t_c$ in FIG. 5B, after the assertion of DS0* in which to capture the data. Hence, slave modules must be prepared to capture data at any time, as DTACK* is not referenced during the transfer cycle.

Figure 6A:
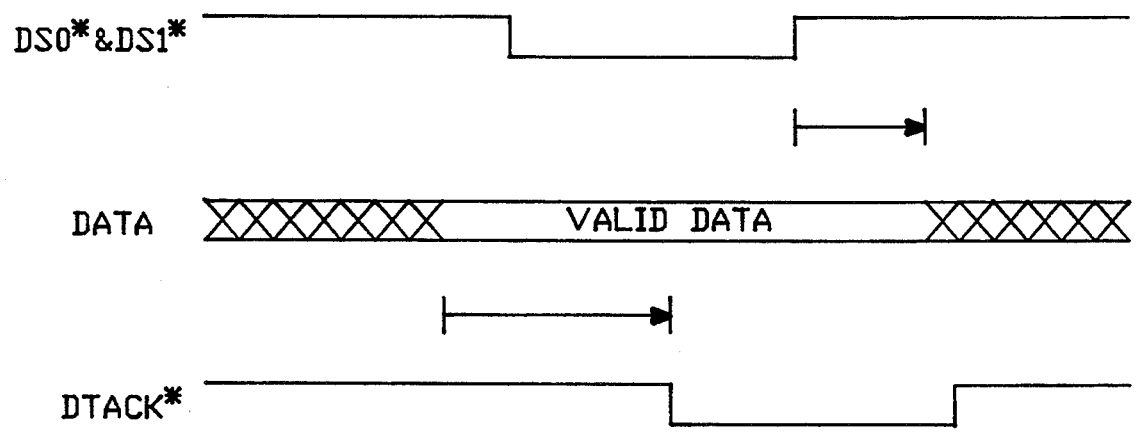
FIG. 6A is a timing diagram illustrating the standard VMEbus protocol for data referencing during a BLOCK READ cycle.

FIG. 6A is a timing diagram illustrating the standard VMEbus protocol for data referencing during a BLOCK READ cycle. In a standard VMEbus BLOCK READ operation, the master asserts DS0* and DS1*, as shown in FIG. 6A. The slave, in response to the assertion of DS0* and DS1*, broadcasts the data to be transferred across the bus and asserts DTACK*. Valid data is guaranteed to be broadcast to the master for a given period of time after the assertion of DTACK* by the slave. The master then deasserts DS0* and DS1*. The BLOCK READ cycle is completed upon deassertion of DTACK* by the slave.

Figure 6B:
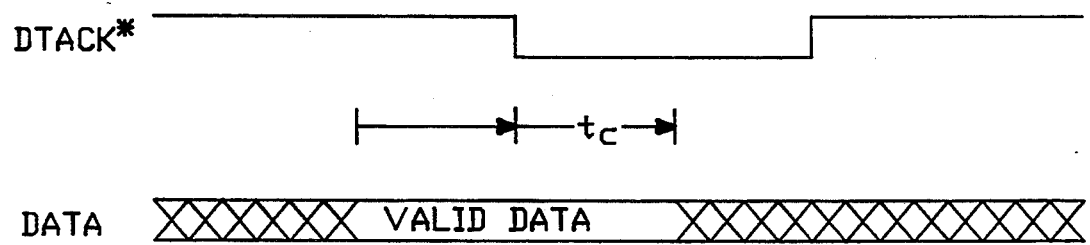
FIG. 6B is a timing diagram illustrating the fast transfer protocol of the present invention for data referencing during a BLOCK READ cycle.

FIG. 6B is a timing diagram illustrating the fast transfer protocol of the present invention for data referencing during a BLOCK READ cycle. The transfer of data during a BLOCK READ cycle is referenced only to DTACK*, as shown in FIG. 6B. The master asserts DS0*. The slave broadcasts data to the master and then asserts DTACK*, as shown in FIG. 6B. Under the fast transfer protocol, the master is given a predetermined period of time, $t_c$ in FIG. 6B, after the assertion of DTACK, in which to capture the data. Hence, master modules must be prepared to capture data at any time as DS0* is not referenced during the transfer cycle.

Figure 7A:
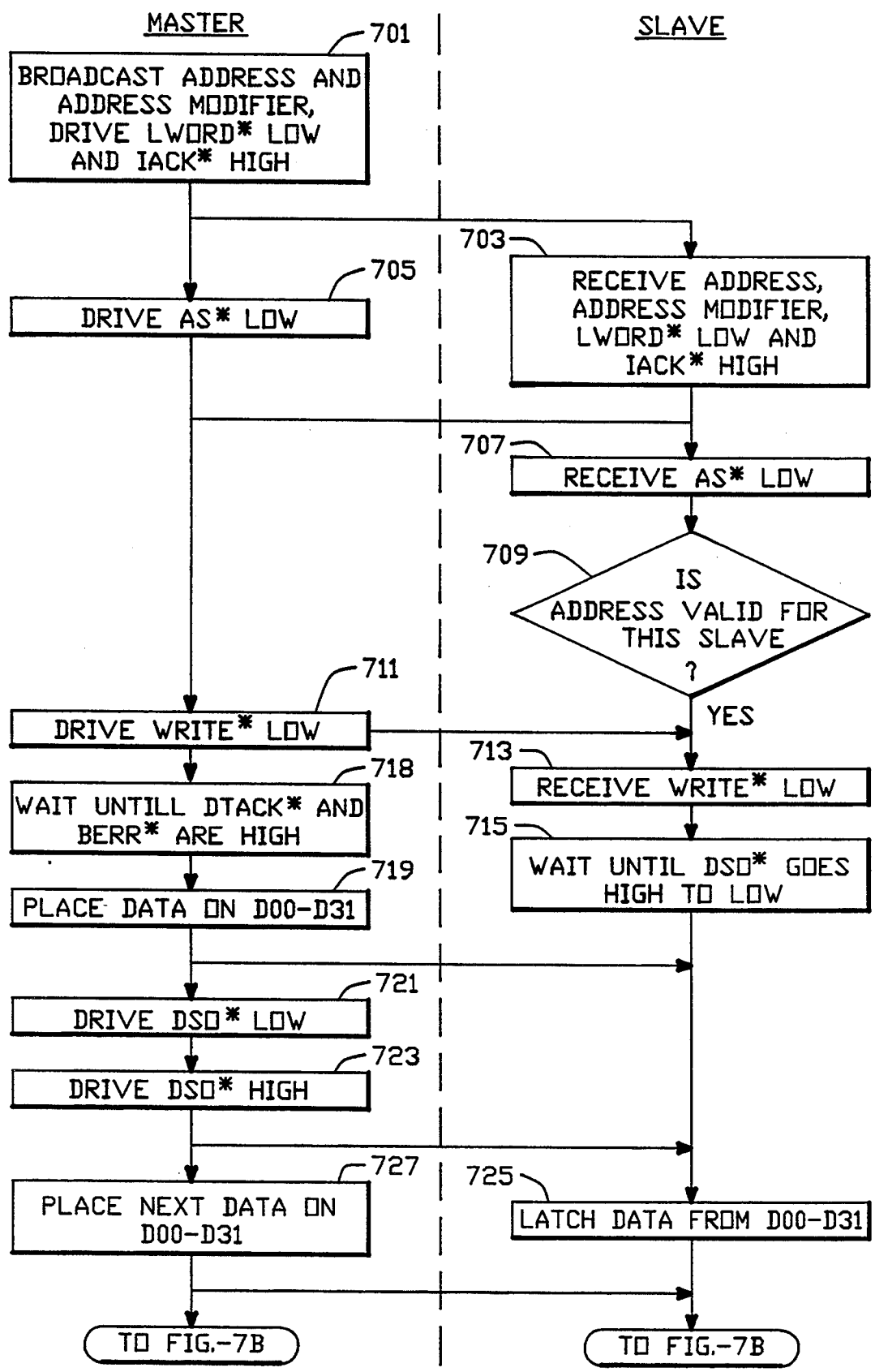
FIG. 7A is a flowchart illustrating the operation of the fast transfer protocol BLOCK WRITE cycle.
Figure 7B:
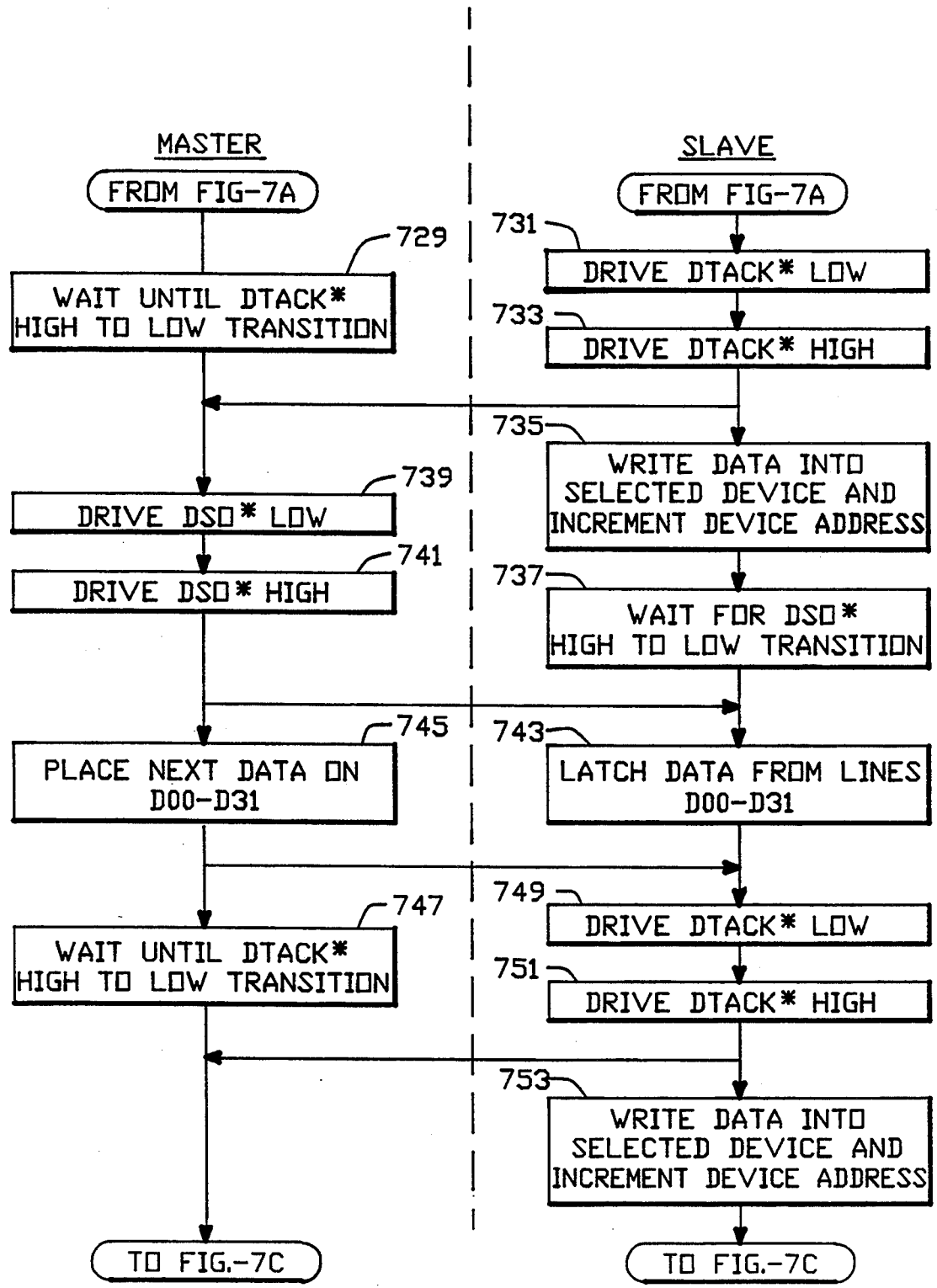
FIG. 7B is a continuation of the flowchart of FIG. 7A.
Figure 7C:
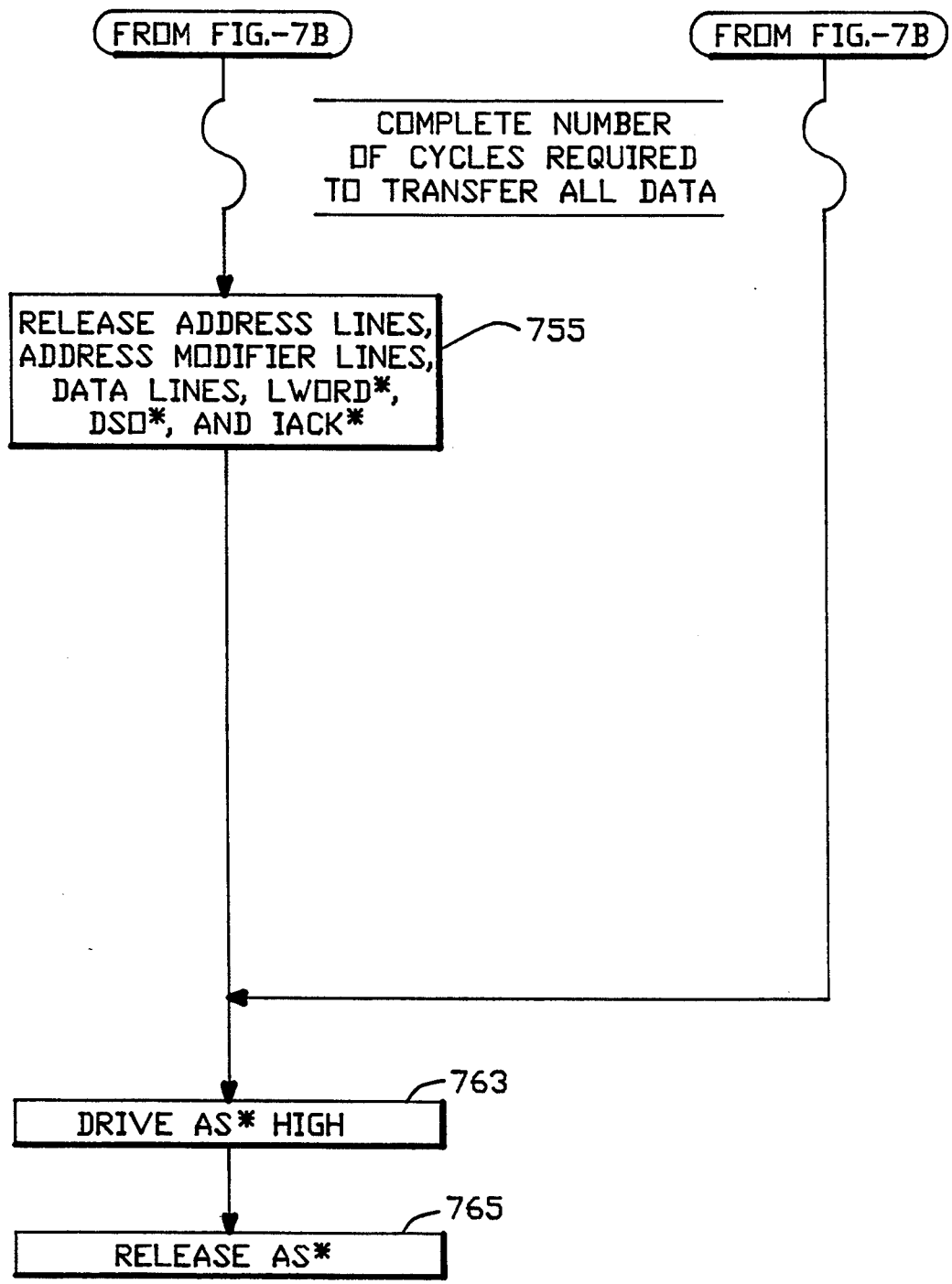
FIG. 7C is a continuation of the flowchart of FIG. 7B.

FIG. 7, parts A through C, is a flowchart illustrating the operations involved in accomplishing the fast transfer protocol BLOCK WRITE cycle of the present invention. To initiate a BLOCK WRITE cycle, the master broadcasts the memory address of the data to be transferred and the address modifier across the DTB bus. The master also drives interrupt acknowledge signal (IACK*) high and the LWORD* signal low 701. The IACK* signal is a standard VMEbus protocol signal used to acknowledge an interrupt request from the priority interrupt bus.

A special address modifier broadcast by the master indicates to the slave module that the fast transfer protocol will be used to accomplish the BLOCK WRITE. In one embodiment of the invention, the hexadecimal address modifier "ff," which is one of the user defined address modifiers under the VMEbus standard, is broadcast to the slave to indicate that the fast transfer protocol will be used. However, it should be understood that any of the user defined address modifiers might be designated as the fast transfer protocol address modifier.

In order to remain in compliance with the VMEbus standard, the block must not cross a 256 byte boundary without performing a new address cycle.

The slave modules connected to the DTB receive the address and the address modifier broadcast by the master across the bus and receive LWORD* low and IACK* high 703. Shortly after broadcasting the address and address modifier 701, the master drives the AS* signal low 705. The slave modules receive the AS* low signal 707. Each slave individually determines whether it will participate in the data transfer by determining whether the broadcasted address is valid for the slave in question 709. If the address is not valid, the data transfer does not involve that particular slave and it ignores the remainder of the data transfer cycle.

The master drives WRITE* low to indicate that the transfer cycle about to occur is a WRITE operation 711. The slave receives the WRITE* low signal 713 and, knowing that the data transfer operation is a WRITE operation, awaits receipt of a high to low transition on the DS0* signal line 715. The master will wait until both DTACK* and BERR* are high 718, which indicates that the previous slave is no longer driving the DTB.

The master proceeds to place the first segment of the data to be transferred on data lines D00 through D31, 719. After placing data on D00 through D31, the master drives DS0* low 721 and, after a predetermined interval, drives DS0* high 723.

In response to the transition of DS0* from high to low, respectively 721 and 723, the slave latches the data being transmitted by the master over data lines D00 through D31, 725. It should be noted that the latching operation is responsive only to the DS0* signal. In the fast transfer protocol of present invention, DTACK* is not referenced for purposes of latching data placed on the data lines by the master. The master places the next segment of the data to be transferred on data lines D00 through D31, 727, and awaits receipt of a DTACK* signal in the form of a high to low transition signal, 729 in FIG. 7B.

Referring to FIG. 7B, the slave then drives DTACK* low, 731, and, after a predetermined period of time, drives DTACK high, 733. The data latched by the slave, 725, is written to a device, which has been selected to store the data 735. The slave also increments the device address 735. The slave then waits for another transition of DS0* from high to low 737.

To commence the transfer of the next segment of the block of data to be transferred, the master drives DS0* low 739 and, after a predetermined period of time, drives DS0* high 741. In response to the transition of DS0* from high to low, respectively 739 and 741, the slave latches the data being broadcast by the master over data lines D00 through D31, 743. The master places the next segment of the data to be transferred on data lines D00 through D31, 745, and awaits receipt of a DTACK* signal in the form of a high to low transition, 747.

The slave then drives DTACK* low, 749, and, after a predetermined period of time, drives DTACK* high, 751. The data latched by the slave, 743, is written to the device selected to store the data and the device address is incremented 753. The slave waits for another transition of DS0* from high to low 737.

The transfer of data will continue in the above-described manner until all of the data has been transferred from the master to the slave. After all of the data has been transferred, the master will release the address lines, address modifier lines, data lines, IACK* line, LWORD* line and DS0* line, 755. The master will drive AS* high 763 and then release the AS* line 765.

Figure 8A:
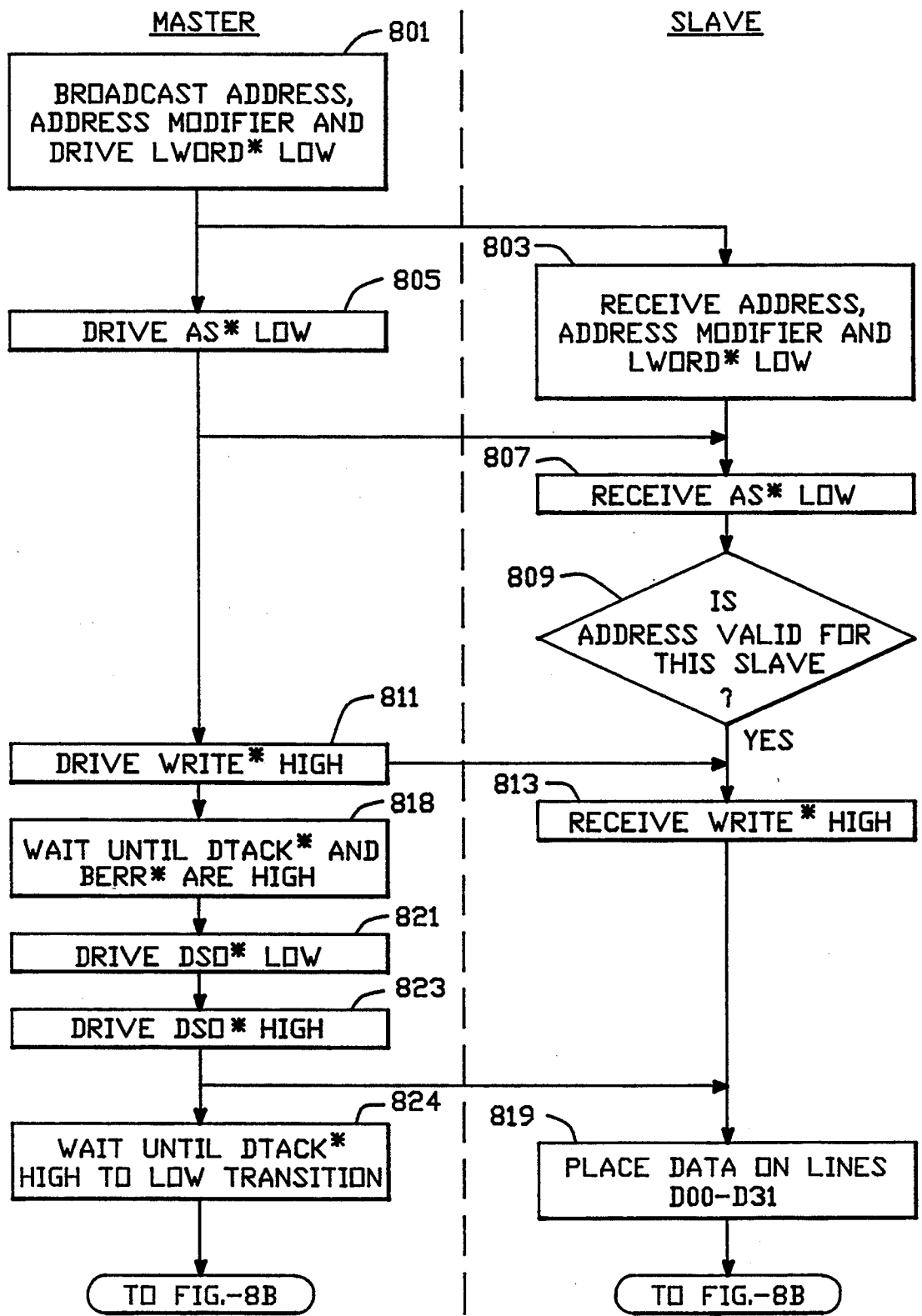
FIG. 8A is a flowchart illustrating the operation of the fast transfer protocol BLOCK READ cycle.

FIG. 8, parts A through C, is a flowchart illustrating the operations involved in accomplishing the fast transfer protocol BLOCK READ cycle of the present invention. To initiate a BLOCK READ cycle, the master broadcasts the memory address of the data to be transferred and the address modifier across the DTB bus 801. The master drives the LWORD* signal low and the IACK* signal high 801. As noted previously, a special address modifier indicates to the slave module that the fast transfer protocol will be used to accomplish the BLOCK READ.

The slave modules connected to the DTB receive the address and the address modifier broadcast by the master across the bus and receive LWORD* low and IACK* high 803. Shortly after broadcasting the address and address modifier 801, the master drives the AS* signal low 805. The slave modules receive the AS* low signal 807. Each slave individually determines whether it will participate in the data transfer by determining whether the broadcasted address is valid for the slave in question 809. If the address is not valid, the data transfer does not involve that particular slave and it ignores the remainder of the data transfer cycle.

The master drives WRITE* high to indicate that the transfer cycle about to occur is a READ operation 811. The slave receives the WRITE* high signal 813 and, knowing that the data transfer operation is a READ operation, places the first segment of the data to be transferred on data lines D00 through D31 819. The master will wait until both DTACK* and BERR* are high 818, which indicates that the previous slave is no longer driving the DTB.

Figure 8B:
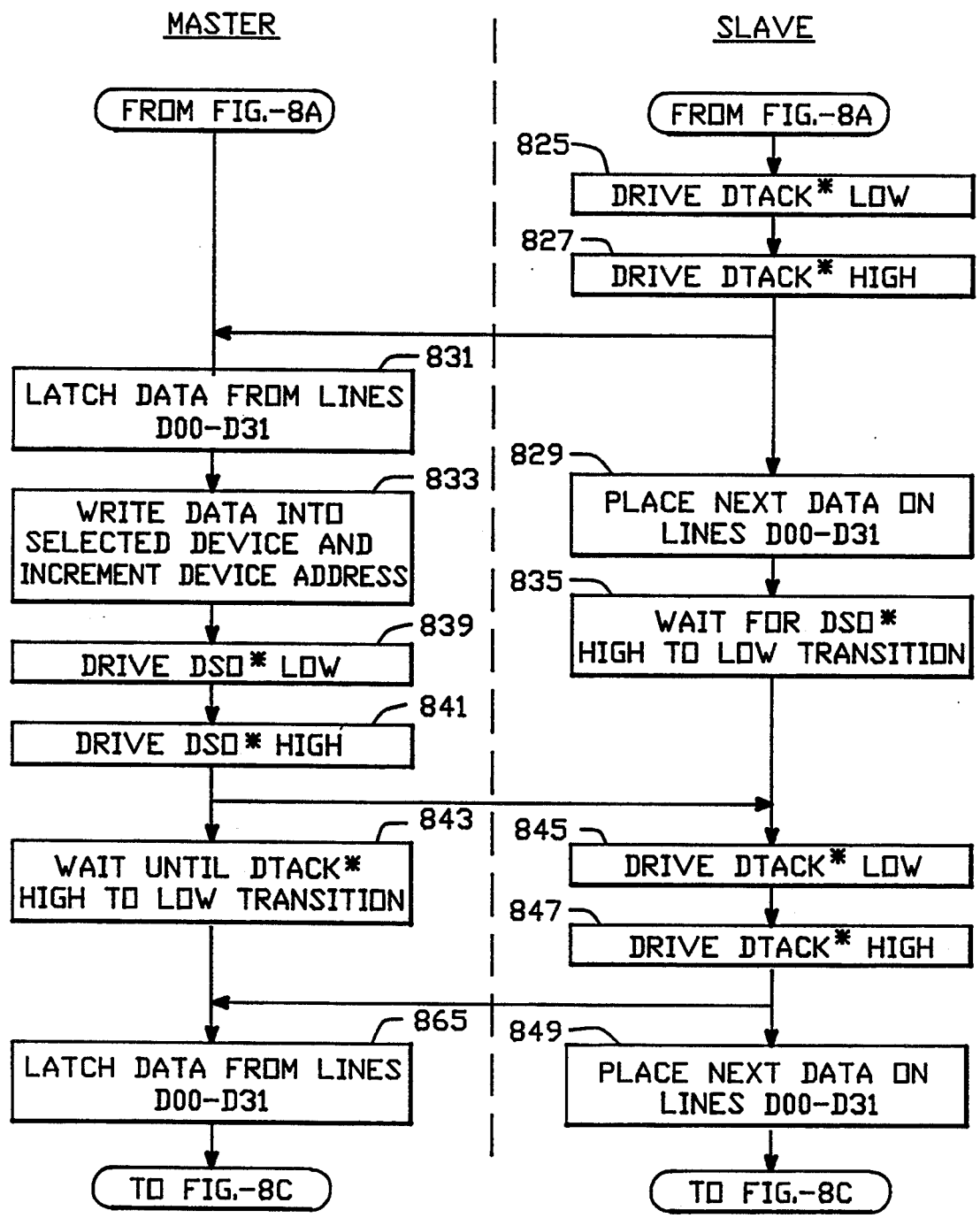
FIG. 8B is a continuation of the flowchart of FIG. 8A.
Figure 8C:
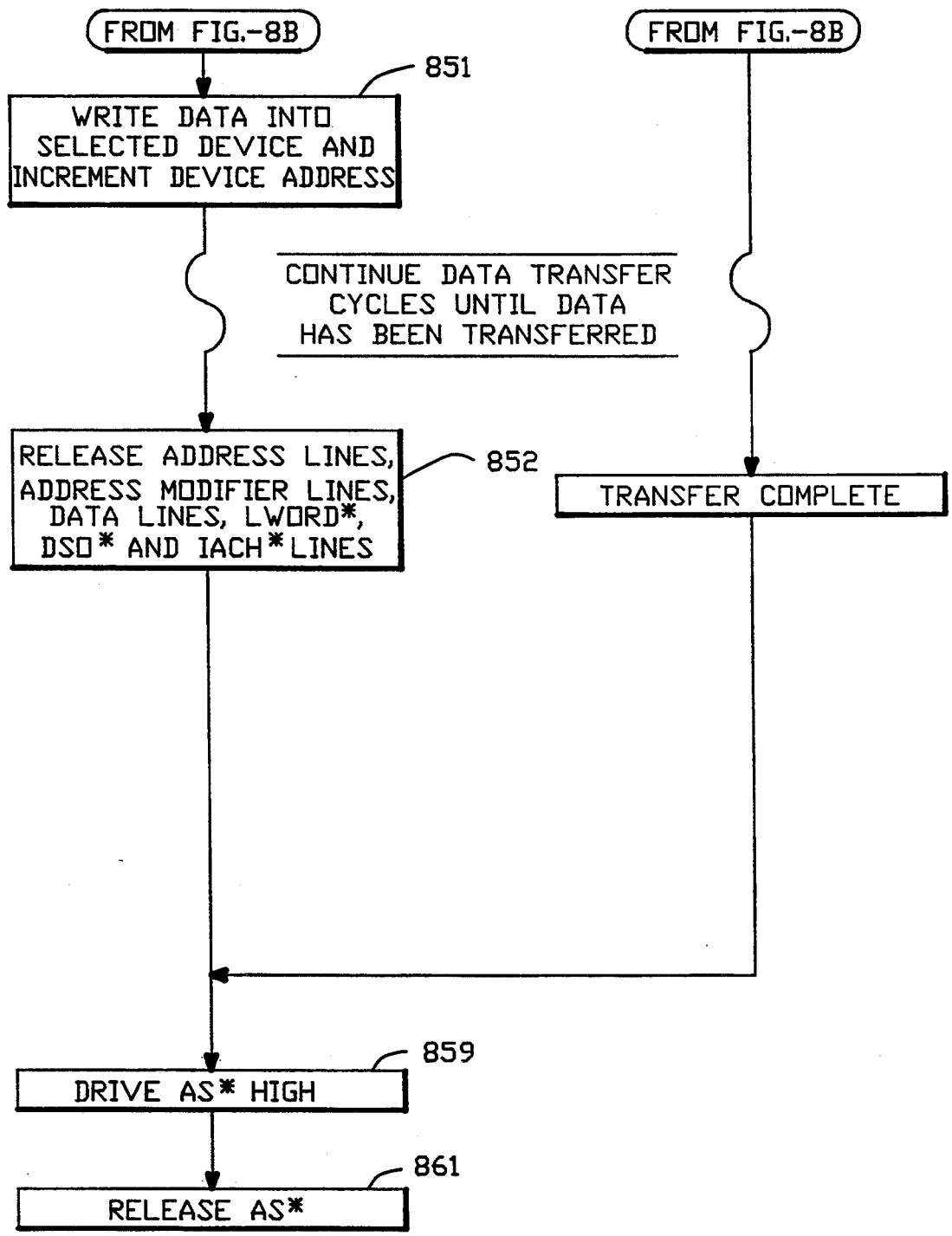
FIG. 8C is a continuation of the flowchart of FIG. 8B.

The master then drives DS0* low 821 and, after a predetermined interval, drives DS0* high 823. The master then awaits a high to low transition on the DTACK* signal line 824. As shown in FIG. 8B, the slave then drives the DTACK* signal low 825 and, after a predetermined period of time, drives the DTACK* signal high 827.

In response to the transition of DTACK* from high to low, respectively 825 and 827, the master latches the data being transmitted by the slave over data lines D00 through D31, 831. It should be noted that the latching operation is responsive only to the DTACK* signal. In the fast transfer protocol of the present invention, DS0* is not referenced for purposes of latching data placed on the data lines by the master. The data latched by the master, 831, is written to a device, which has been selected to store the data and the device address as incremented 833.

The slave places the next segment of the data to be transferred on data lines D00 through D31, 829, and then waits for another transition of DS0* from high to low 835.

To commence the transfer of the next segment of the block of data to be transferred, the master drives DS0* low 839 and, after a predetermined period of time, drives DS0* high 841. The master then waits for the DTACK* line to transition from high to low, 843.

The slave drives DTACK* low, 845, and, after a predetermined period of time, drives DTACK* high, 847. In response to the transition of DTACK* from high to low, respectively 845 and 847, the master latches the data being transmitted by the slave over data lines D00 through D31, 865. The data latched by the master, 865, is written to the device selected to store the data, 851 in FIG. 8C, and the device address is incremented. The slave places the next segment of the data to be transferred on data lines D00 through D31, 849.

The transfer of data will continue in the above-described manner until all of the data to be transferred from the slave to the master has been written into the device selected to store the data. After all of the data to be transferred has been written into the storage device, the master will release the address lines, address modifier lines, data lines, the IACK* line, the LWORD* line and DS0* line 852. The master will drive AS* high 859 and release the AS* line 861.

Figure 9:
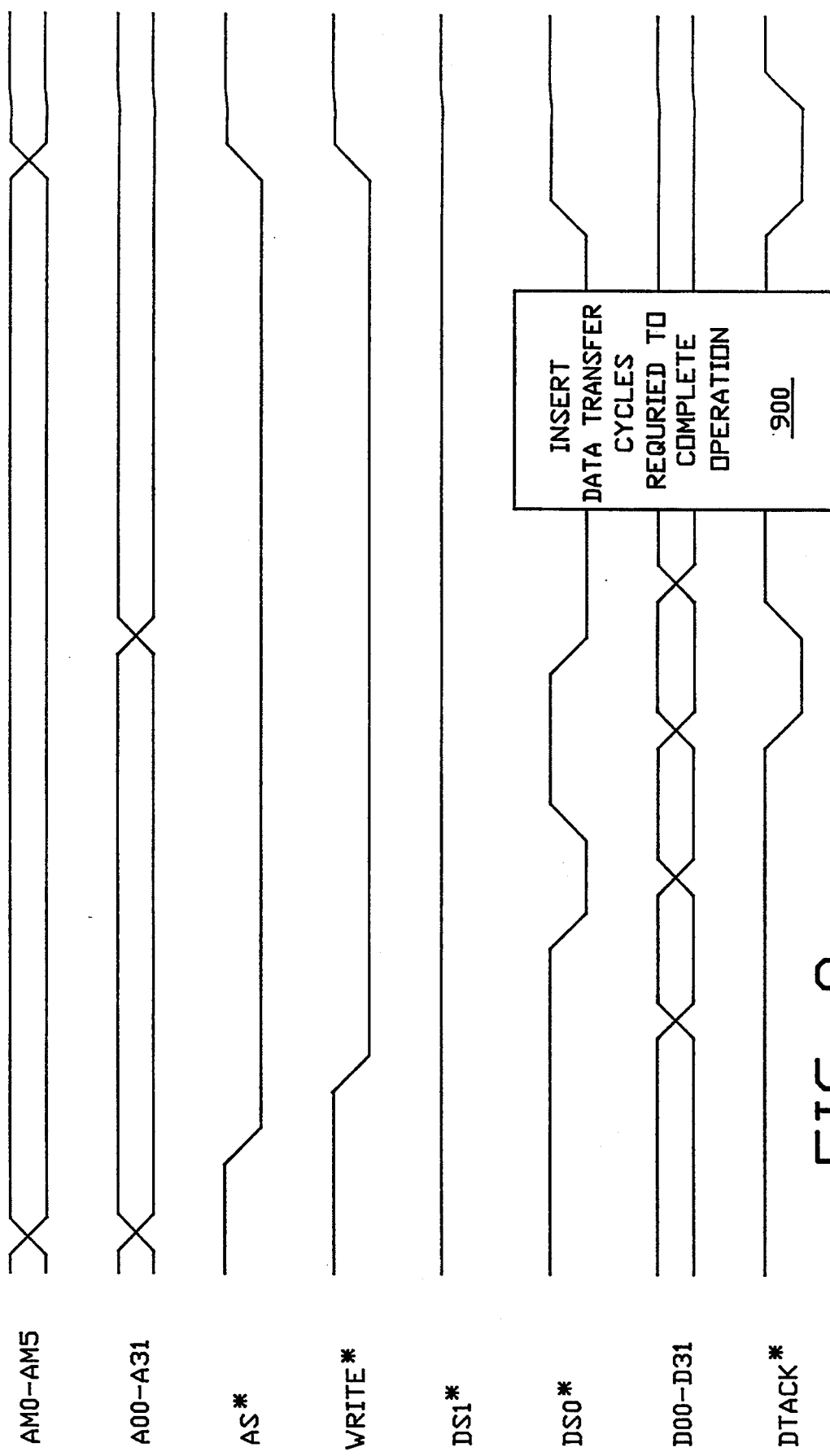
FIG. 9 is a timing diagram illustrating the data transfer timing associated with a fast transfer mode BLOCK WRITE operation.

FIG. 9 is a timing diagram illustrating the data transfer timing associated with a fast transfer mode BLOCK WRITE operation.

As shown in FIG. 9, the address of the location to which data is to be transferred is broadcast on lines A01 through A31. The address modifier, which would include the fast transfer mode address modifier code, is broadcast by the master on lines AM0 through AM5. After the address and address modifier have been set up on their respective lines, the master drives AS* low. The WRITE* line is driven low by the master to indicate, as noted previously, that the operation to follow is a WRITE operation.

Because the DS1* line is not used during a fast transfer mode operation, the line may or may not be asserted throughout the operation.

After driving the WRITE* line low, the master broadcasts the first segment of the data to be transferred on lines D00 through D31.

DS0* is driven low and the signal subsequently deasserted by being driven high, as shown in FIG. 9. The data being broadcast by the master as DS0* is driven low and latched by the slave, in response to the DS0* signal being driven low. After DS0* is driven low, the master broadcasts the next segment of data to be transferred to the slave over lines D00 through D31, as shown in FIG. 9. The slave, in response to DS0* being driven low, subsequently acknowledges the data transfer by driving DTACK* low for a given period and then deasserting the signal by driving the DTACK* line high. As shown in FIG. 9, DS0* is not reasserted until the slave acknowledges the data transfer by driving the DTACK* line low.

As noted previously, the data transfer cycles will continue until all of the data to be transferred has been broadcast to the slave. The number of cycles required to complete the transfer would occur at box 900 in FIG. 9. Box 900 is merely exemplary and not drawn to a particular time scale.

Figure 9A:
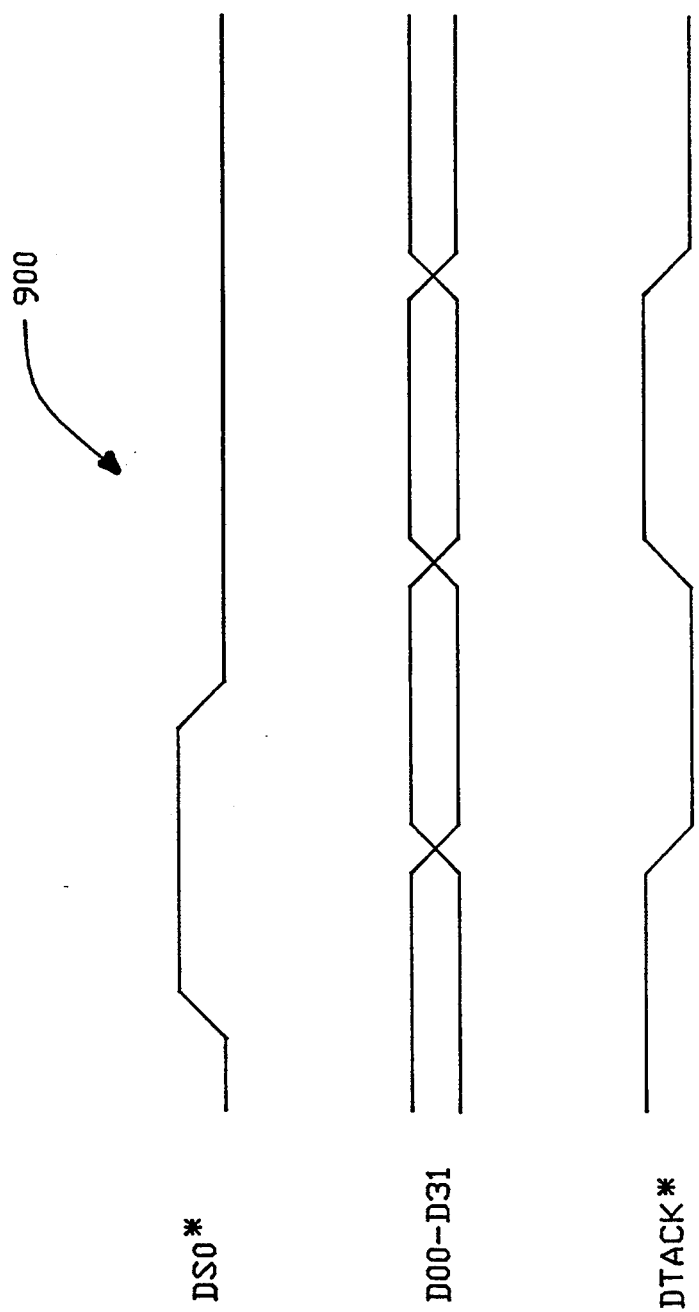
FIG. 9A illustrates a data transfer cycle which could be inserted in the location of box 900 in FIG. 9.

FIG. 9A illustrates a data transfer cycle which could be inserted in the location of box 900 in FIG. 9. As shown in FIG. 9A, DS0* is driven low. In response to the DS0* low signal, the slave latches the data broadcast at the time DS0* went low. The master broadcasts the next segment of the data to be transferred. The slave, acknowledging the data transfer, drives DTACK* low. This operation would continue until all data has been transferred.

Referring again to FIG. 9, after the data transfer operation has been completed, the master deasserts AS* by driving the AS* line high. The master likewise releases the WRITE* line by driving the line high.

The duration of the respective DS0* and DTACK* signals can vary depending upon the application and the system being used. Likewise, the period between the assertion of DS0* and the assertion of DTACK* may also vary depending upon the application and the system being used. Obviously, the data transfer rate will be increased if the duration of the DS0* and DTACK* signals and the period between the assertion of DS0* and DTACK* are minimized.

Figure 10:
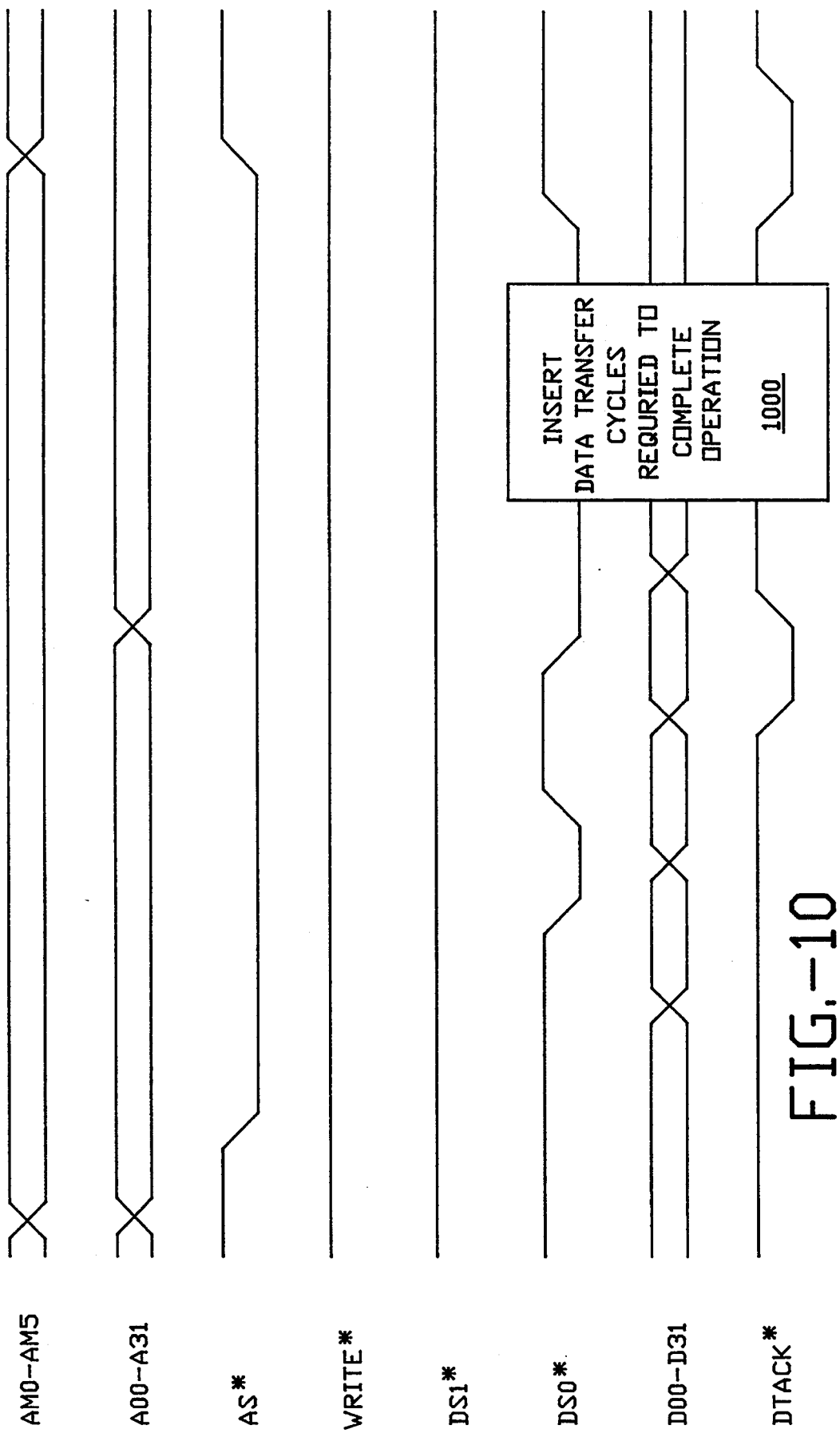
FIG. 10 is a timing diagram illustrating the data transfer timing associated with a fast transfer mode BLOCK READ operation.

FIG. 10 is a timing diagram illustrating the data transfer timing associated with a fast transfer mode BLOCK READ operation.

As shown in FIG. 10, the address of the location to which data is to be transferred is broadcast on lines A01 through A31. The address modifier, which would include the fast transfer mode address modifier code, is broadcast by the master on line AM0 through AM5. After the address and address modifier have been set up on their respective lines, the master drives AS* low. The WRITE* line is driven high by the master to indicate, as noted previously, that the operation to follow is a READ operation.

Because the DS1* line is not used during a fast transfer mode operation, the line remains high throughout the entire operation.

In response to the WRITE* line being driven high, data is broadcast by the slave on lines D00 through D31.

DS0* is driven low and the signal subsequently deasserted by being driven high, as shown in FIG. 10. The slave, in response to DS0* being driven low, subsequently acknowledges the data transfer by driving DTACK* low for a given period and then deasserting the signal by driving the DTACK* line high. The data being broadcast by the slave as DTACK* is driven low is latched by the master, in response to the DTACK* signal being driven low. After DTACK* is driven low, the slave broadcasts the next segment of data to be transferred to the master over lines D00 through D31, as shown in FIG. 10. DS0* is not reasserted until the slave acknowledges the data transfer by driving the DTACK* line low.

As noted previously, the data transfer cycles will continue until all of the data to be transferred has been broadcast to the master. The number of cycles required to complete the transfer would occur at box 1000 in FIG. 10. Box 1000 is merely exemplary and not drawn to a particular time scale. FIG. 10A illustrates a data transfer cycle which could be inserted in the location of box 1000 in FIG. 10. As shown in FIG. 10A, DS0* is driven low. In response to the DS0* low signal, the slave acknowledges the data transfer by driving DTACK* low. In response to the DTACK* low signal, the master latches the data broadcast at time the DTACK* went low. The slave broadcasts the next segment of the data to be transferred. This operation would continue until all data has been transferred.

Referring again to FIG. 10, after the data transfer operation has been completed, the slave drives DTACK* low. In response, the master deasserts AS* by driving the AS* line high. The master likewise releases the WRITE* line.

As already noted with regard to the WRITE operation, the duration of the respective DS0* and DTACK* signals can vary depending upon the application and the system being used. Likewise, the period between the assertion of DS0* and the assertion of DTACK* may also vary depending upon the application and the system being used. Obviously, the data transfer rate will be increased if the duration of the DS0* and DTACK* signals and the period between the assertion of DS0* and DTACK* are minimized.

Because the fast transfer protocol requires that data signals remain on the DTB for a very short period of time, the amount of skew between the control signals and the data signals must be minimized. For example, the DTACK* signal, which references data transfer on a BLOCK READ cycle, must go from high to low in the shortest possible interval so as to enable the master the maximum amount of time, under the circumstances, to capture the data to be transferred.

To implement the fast transfer protocol, a conventional 64 mA tri-state driver 245 is substituted for the 48 mA open collector driver conventionally used in the slave module to drive DTACK* as shown in FIG. 11. This substitution is necessary because the 48 mA open collector DTACK* driver does not drive DTACK* from low to high. Implementation of the 64 mA tri-state driver 245 provides a means of quickly changing the state of the DTACK* signal so as to reduce skew between the DTACK* and data signals.

It should likewise be noted that the data drivers on master and slave modules have been modified. To implement fast transfer protocol in the preferred embodiment of the present invention, the conventional VMEbus data drivers should be replaced with 64 mA tristate drivers in SO-type packages. This modification reduces the ground lead inductance of the actual driver package itself and, thus, reduces "ground bounce"effects which contribute to skew between data, DS0* and DTACK*.

Further, in order to maximize performance, signal return inductance along the bus backplane should be reduced to a level permitting the short signal activation times necessary to implement the fast transfer mode protocol. In the preferred embodiment of the present invention, signal return inductance is reduced using a connector system having a greater number of ground pins so as to minimize signal return and mated-pair pin inductance. One such connector system is the "High Density Plus" connector, Model No. 420-8015-000, manufactured by Teradyne Corporation.

The foregoing description of the present invention merely sets forth the preferred embodiment. Modifications and variations of the invention as described and set forth above may be made which are consistent with the scope and spirit of the present invention and the appended claims. Other aspects, objects and advantages of this invention can be obtained from a study of the drawing, the disclosure and the appended claims.

What is claimed is:

1. A method for implementing a pseudo-synchronous fast transfer VME backplane bus handshake protocol during a data transfer operation in a computer system, said computer system having a master functional unit and a slave functional unit logically interconnected by a VME backplane bus, said VME backplane bus including data lines for transferring data between said master functional unit and said slave functional unit, a data strobe line for communicating a data strobe signal between said master functional unit and said slave functional unit, said data strobe signal having a first state and a second state and a data transfer acknowledge line for communicating a data transfer acknowledge signal between said master functional unit and said slave functional unit, said data transfer acknowledge signal having a first state and a second state, the method for the transfer of data comprising the steps of:

driving said data strobe signal from said first state to said second state on said data strobe line by the master functional unit—sensing and then driving said data strobe signal from said second state to said first state on said data strobe line by the master functional unit a specified period of time after the transition of said data strobe signal from said first state to said second state where the driving of said data strobe signal from said second state to said first state does not require a prior change in state of said data transfer acknowledge signal on said data transfer acknowledge line;

driving said data transfer acknowledge signal from said first state to said second state on data transfer acknowledge line by said slave module and then driving said data transfer acknowledge signal from said second state to said first state on said data transfer acknowledge line by the slave functional unit and then driving said data transfer acknowledge signal from said second state to said first state on said data transfer acknowledge line a specified period of time after the transition of said data transfer acknowledge signal from said first state to said second state where said driving of said data transfer acknowledge signal from said second state to said first state does not require a prior change in state of said data strobe signal on said data strobe line;

whereby said fast transfer mode handshake protocol for each transfer data cycle between the master functional unit and the slave functional unit is controlled only by the driving of said data strobe signal from a first state to a second state on the data strobe line and the driving of said data transfer acknowledge signal from said first state to said second state on said data transfer acknowledge line.

2. A method for implementing a pseudo-synchronous fast transfer VME backplane bus handshake protocol during a BLOCK WRITE cycle of a BLOCK WRITE operation in a computer system having a master functional unit and a slave functional unit logically interconnected by a VME backplane bus, said VME backplane bus including data lines for transferring data between said master functional unit and said slave functional unit, a data strobe line for communicating a data strobe signal between said master functional unit and said slave functional unit, said data strobe signal having a first state and a second state and a data transfer acknowledge line for communicating a data transfer acknowledge signal between said master functional unit and said slave functional unit, said data transfer acknowledge signal having a first state and a second state, the method for each BLOCK WRITE cycle comprising the steps of:

broadcasting on said data lines the data to be transferred by the master functional unit to the slave functional unit;

driving said data strobe signal from said first state to said second state on said data strobe line by the master functional unit;

driving said data strobe signal from said second state to said first state on said data strobe line by the master functional unit a specified period of time after the transition of said data strobe signal from said first state to said second state where the driving of said data strobe signal from said second state to said first state does not require a prior change in state of said data transfer acknowledge signal on said data transfer acknowledge line;

capturing said broadcasted data on said data lines by the slave functional unit in response to said data strobe signal on said data strobe line being driven from said first state to said second state within a specified period of time after said data strobe signal is driven from said first state to said second state on said data strobe line and independently of when said data strobe signal is driven from said second state to said first state on said data strobe line; and maintaining the state of said data transfer acknowledge signal on said data transfer acknowledge line constant during said BLOCK WRITE cycle;

whereby the capturing of data by said slave functional unit is controlled [by]only by the driving of said data strobe line from said first state to said second state.

3. A method for implementing a pseudo-synchronous fast transfer VME backplane bus handshake protocol during a BLOCK READ cycle of a BLOCK READ operation in a computer system having a master functional unit and a slave functional unit logically interconnected by a VME backplane bus, said VME backplane bus including data lines for transferring data between said master functional unit and said slave functional unit, a data strobe line for communicating a data strobe signal between said master functional unit and said slave functional unit, said data strobe signal having a first state and a second state and a data transfer acknowledge line for communicating a data transfer acknowledge signal between said master functional unit and said slave functional unit, said data transfer acknowledge signal having a first state and a second state, the method for each BLOCK READ cycle comprising the steps of:

broadcasting on said data lines the data to be transferred by the master functional unit to the slave functional unit;

driving said data transfer acknowledge signal from said first state to said second state on said data transfer acknowledge line by the slave functional unit;

driving said data transfer acknowledge signal from said second state to said first state on said data transfer acknowledge line by the slave functional unit a specified period of time after the transition of said data transfer acknowledge signal from said first state to said second state where said driving of said data transfer acknowledge Signal from said second state to said first state does not require a prior change in state of said data strobe signal on said data strobe line.;

capturing said broadcasted data on said data lines by the master functional unit in response to said data transfer acknowledge signal on said data transfer acknowledge line being driven from said first state to said second state within a specified period of time after said data transfer acknowledge signal is driven from said first state to said second state on said data transfer acknowledge line and independently of when said data transfer acknowledge signal is driven from said second state to said first state on said data transfer acknowledge line; and maintaining the state of said data strobe signal on said data strobe line constant during said BLOCK READ cycle;

whereby the capturing of data by said master functional unit is controlled only by the driving of said data transfer acknowledge line from said first state to said second state.

* * * * *

UNITED STATES PATENT AND TRADEMARK OFFICE
CERTIFICATE OF CORRECTION

PATENT NO. : 5,388,231
DATED : February 7, 1995
INVENTOR(S) : Daryl D. Starr

It is certified that error appears in the above-indentified patent and that said Letters Patent is hereby corrected as shown below:

```
ABSTRACT, line 2, "VMS" should be --VME--.
Column 9, line 27, after "module" insert --200--.
Column 9, line 36, after "module" insert --300--.
Column 9, line 62, "DTACK,," should be --DTACK*,--.
Column 10, line 11, "DTACK,," should be --DTACK*,--.
Column 11, line 42, '"ff,"' should be --"1f,"--.
Column 16, line 63, insert --said-- after "on".
Column 16, line 64, delete "module" and insert --functional
                    unit--.
Column 16, line 68, delete "and then driving said data transfer
                    acknowledge".
Column 17, line 1, delete "signal from said second state to
                    said first state on said".
Column 17, line 2, delete "data transfer acknowledge line".
Column 18, line 6, delete "[by]".
Column 18, line 39, "Signal" should be --signal--.
Column 18, line 42, after "line" delete ".".
```

Signed and Sealed this

Twentieth Day of August, 1996

Attest:

BRUCE LEHMAN

*Attesting Officer*     Commissioner of Patents and Trademarks